No. 760,100. PATENTED MAY 17, 1904.
B. VON BÜLTZINGSLÖWEN.
MACHINE FOR BENDING THE CROSS HEADS AND EYES OF WIRE BALE TIES.
APPLICATION FILED SEPT. 18, 1903.
NO MODEL. 12 SHEETS—SHEET 3.
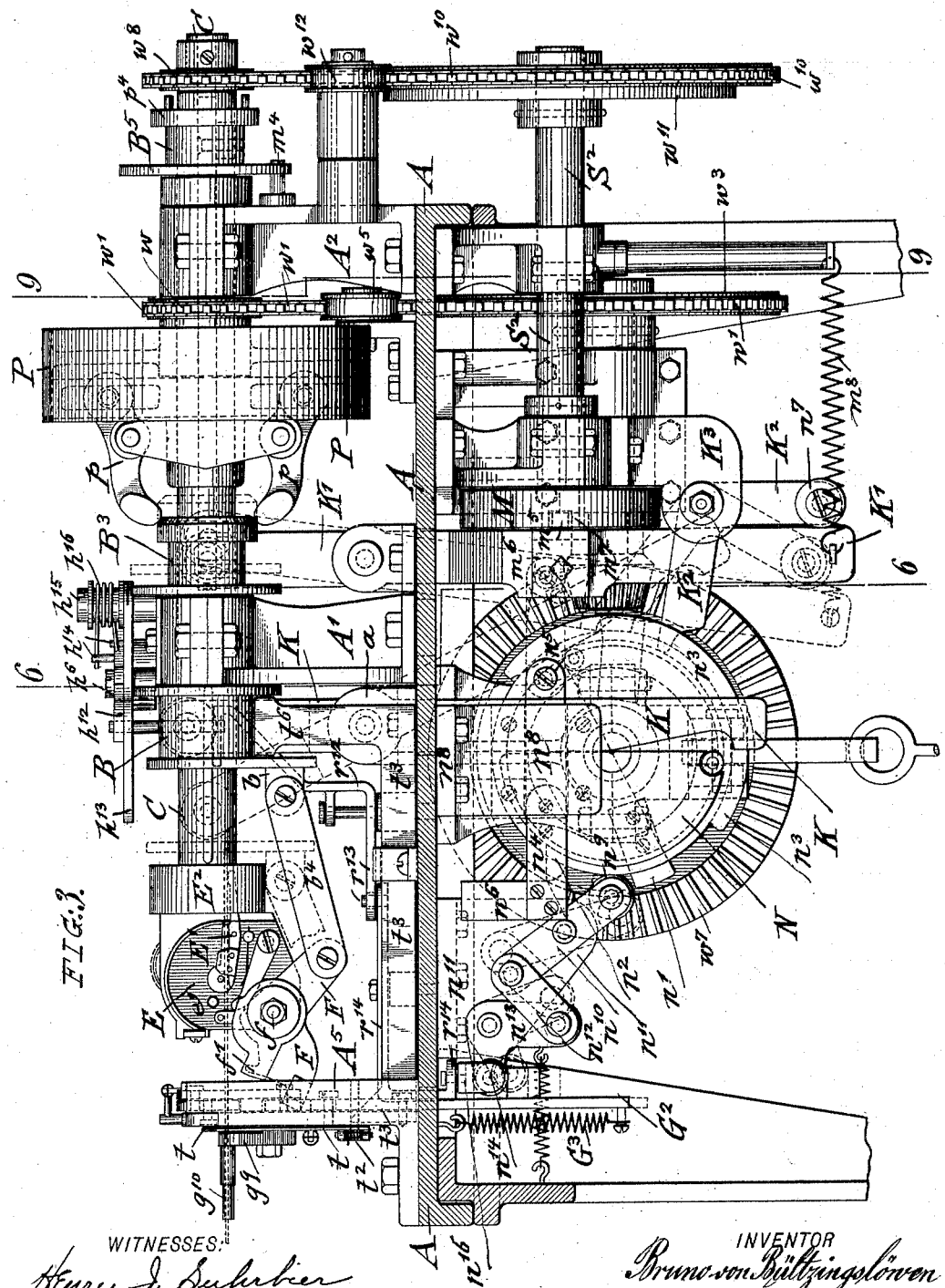

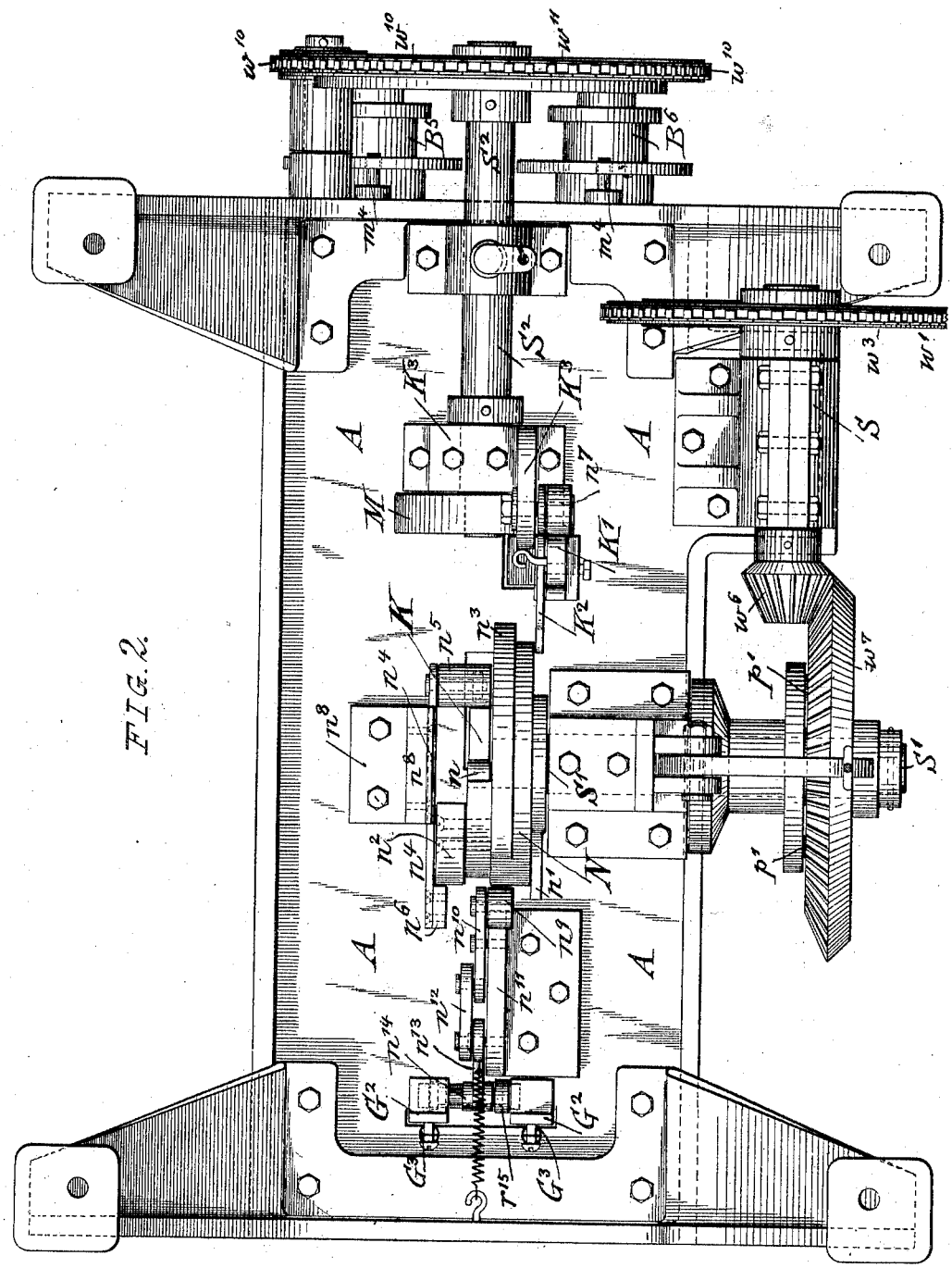

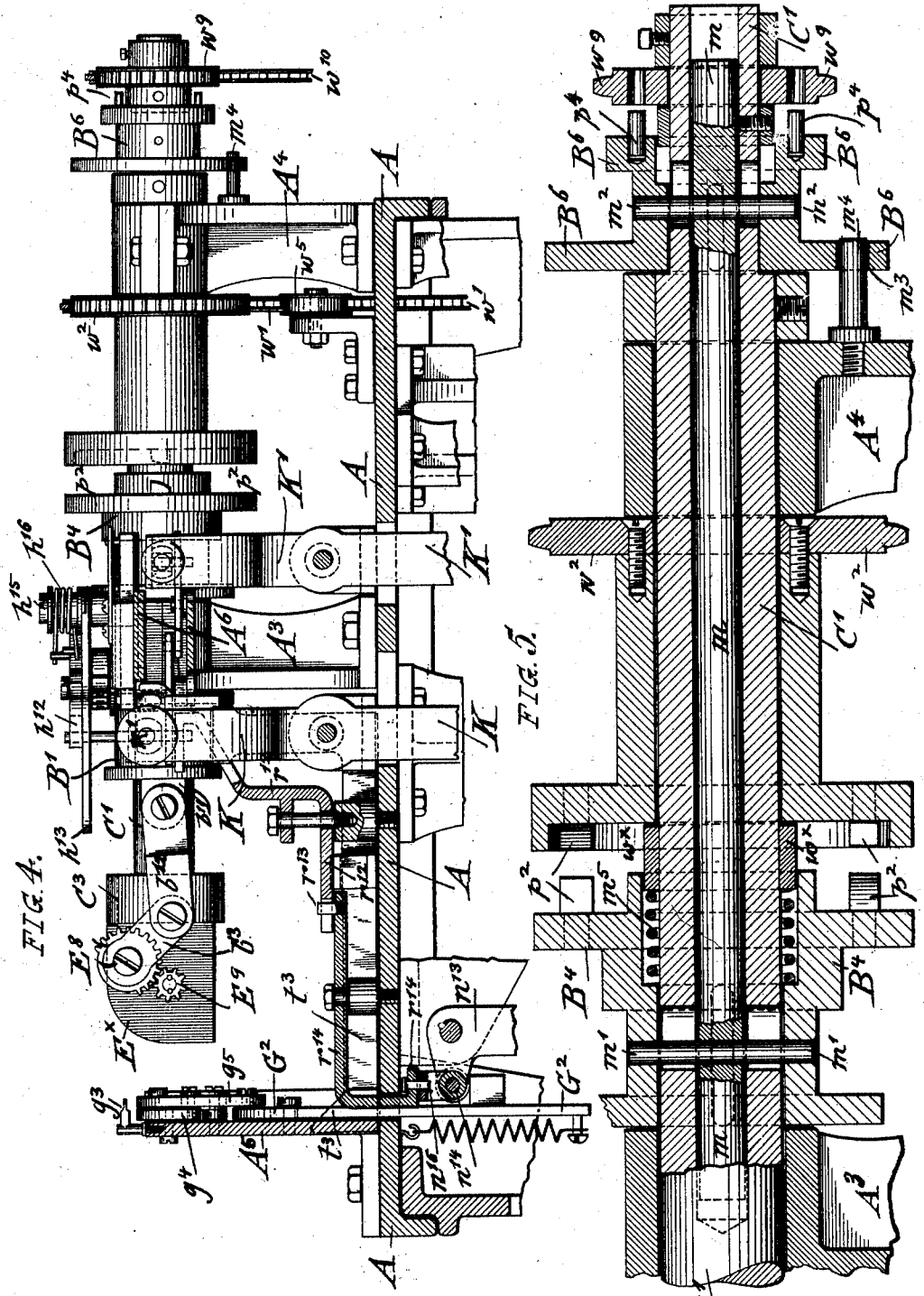

No. 760,100. PATENTED MAY 17, 1904.
B. VON BÜLTZINGSLÖWEN.
MACHINE FOR BENDING THE CROSS HEADS AND EYES OF WIRE BALE TIES.
APPLICATION FILED SEPT. 18, 1903.
NO MODEL. 12 SHEETS—SHEET 5.
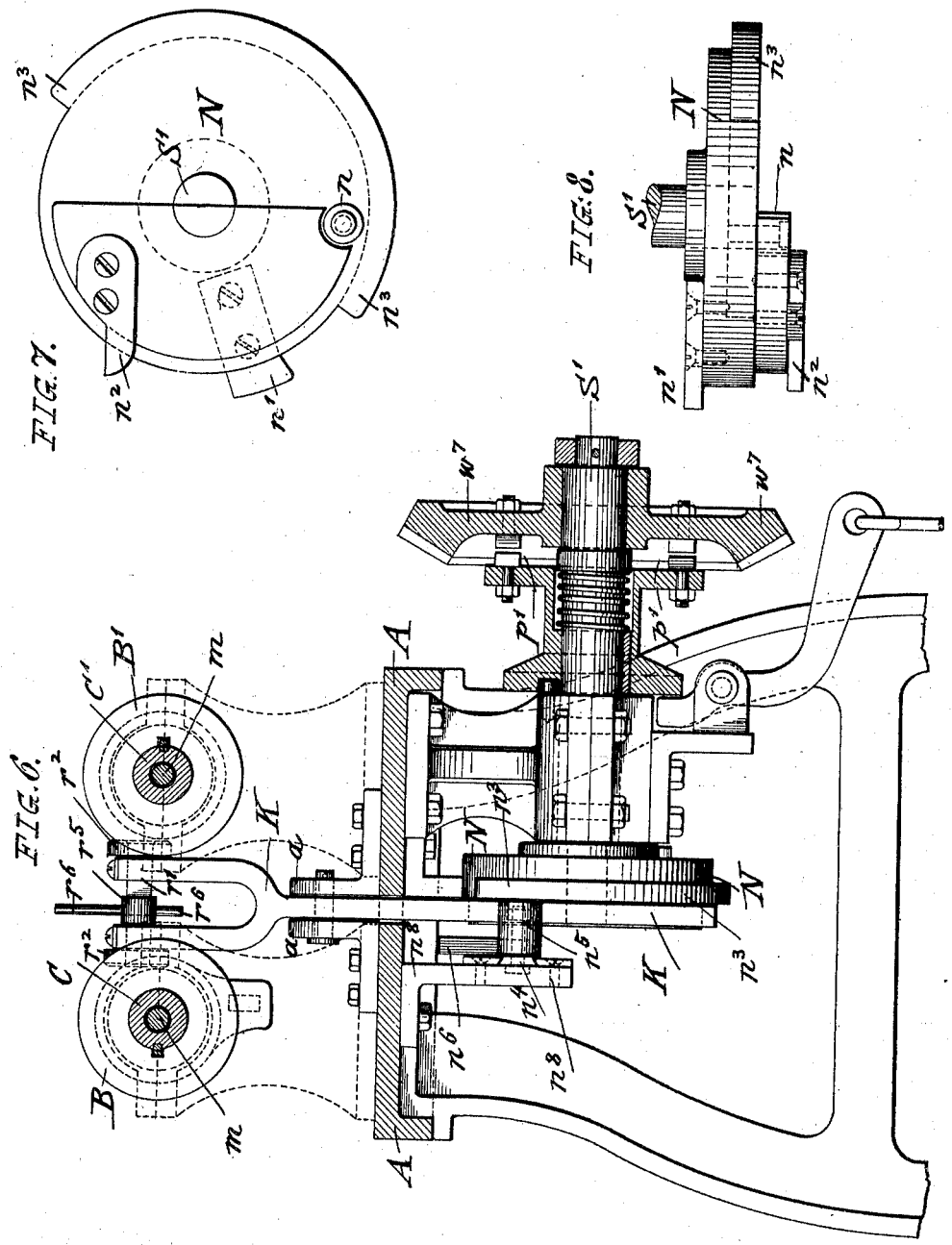
WITNESSES:
INVENTOR
Bruno von Bültzingslöwen
BY
ATTORNEYS

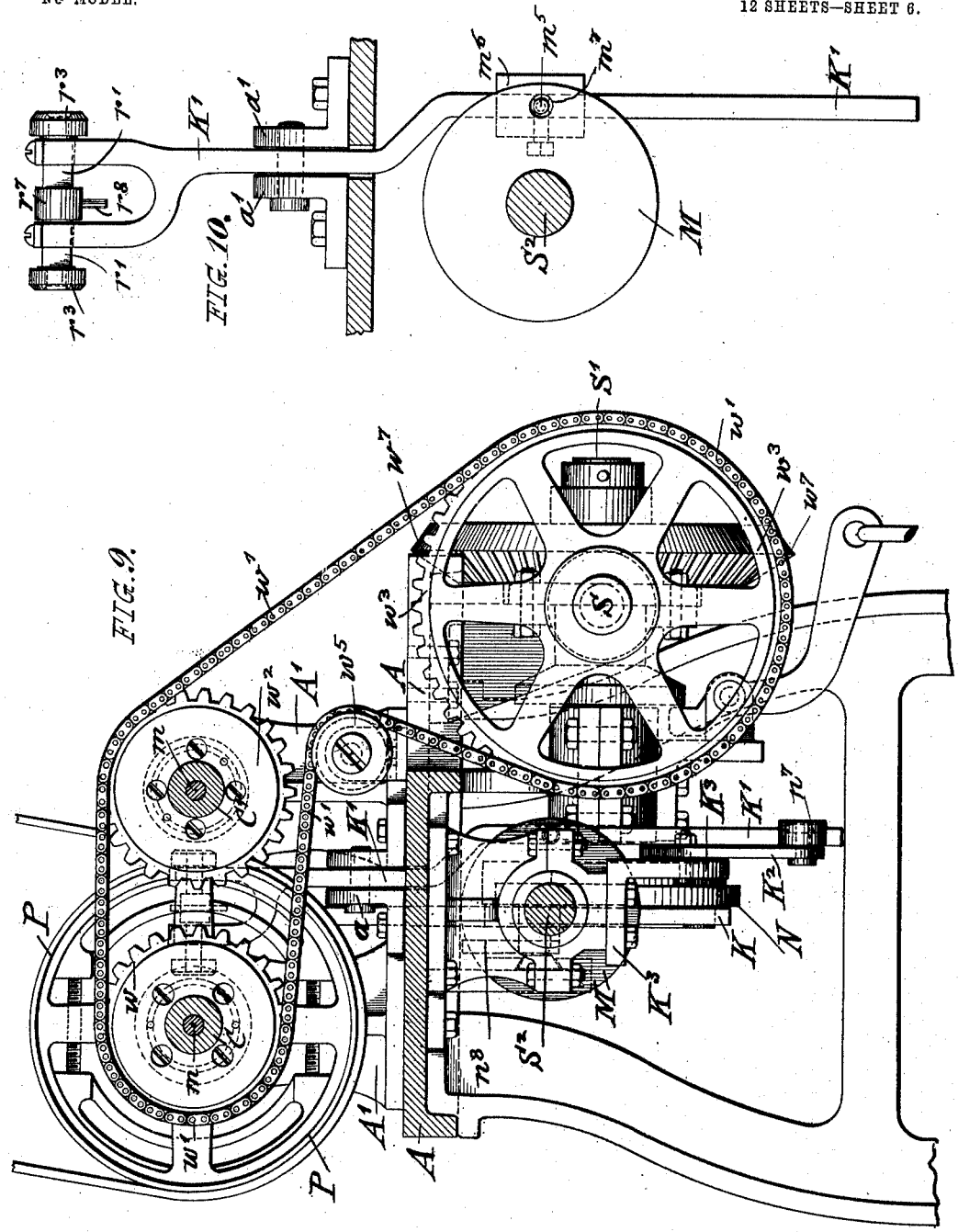

No. 760,100. PATENTED MAY 17, 1904.
B. VON BÜLTZINGSLÖWEN.
MACHINE FOR BENDING THE CROSS HEADS AND EYES OF WIRE BALE TIES.
APPLICATION FILED SEPT. 18, 1903.
NO MODEL. 12 SHEETS—SHEET 7.
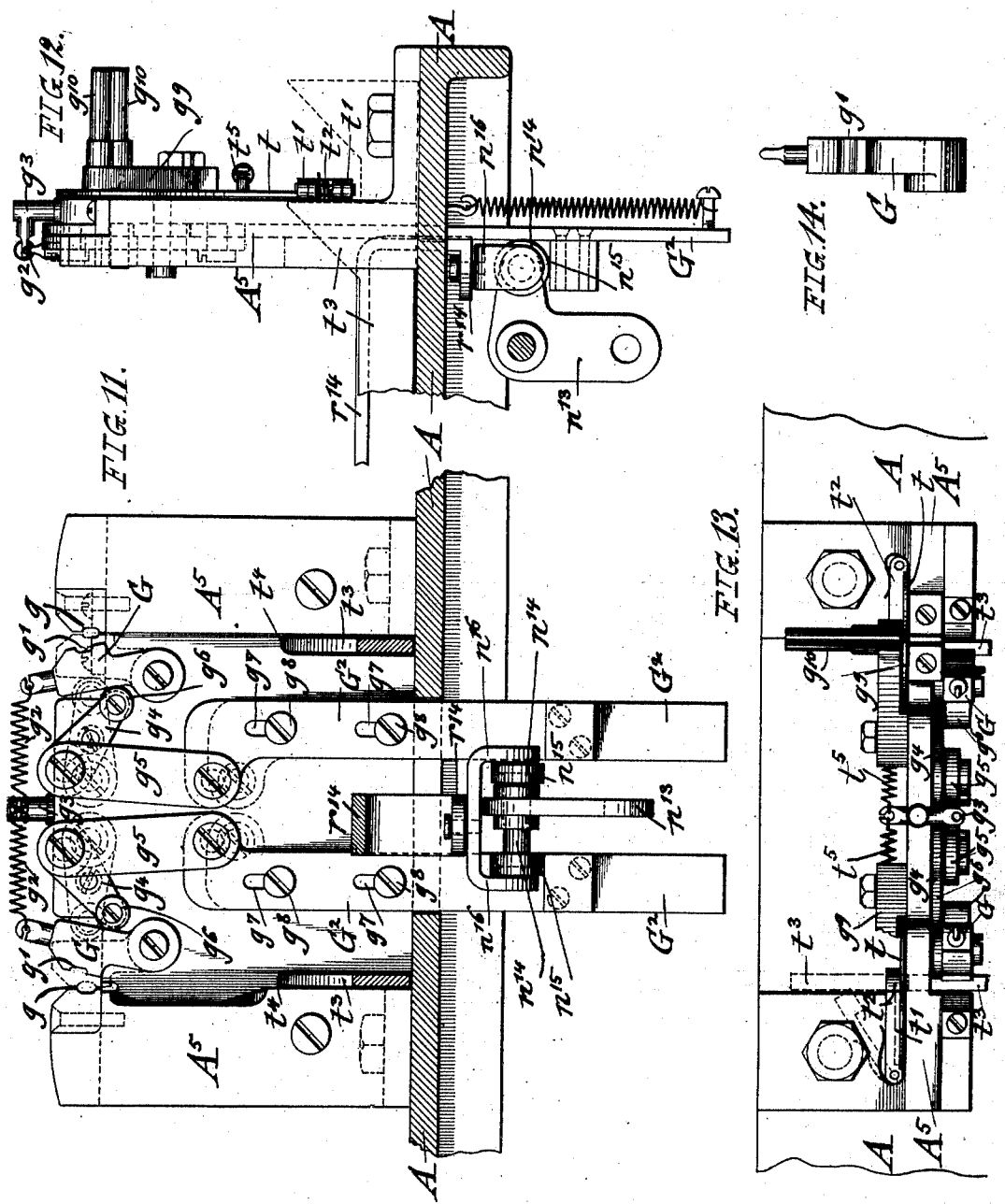

No. 760,100. PATENTED MAY 17, 1904.
B. VON BÜLTZINGSLÖWEN.
MACHINE FOR BENDING THE CROSS HEADS AND EYES OF WIRE BALE TIES.
APPLICATION FILED SEPT. 18, 1903.
NO MODEL. 12 SHEETS—SHEET 8.
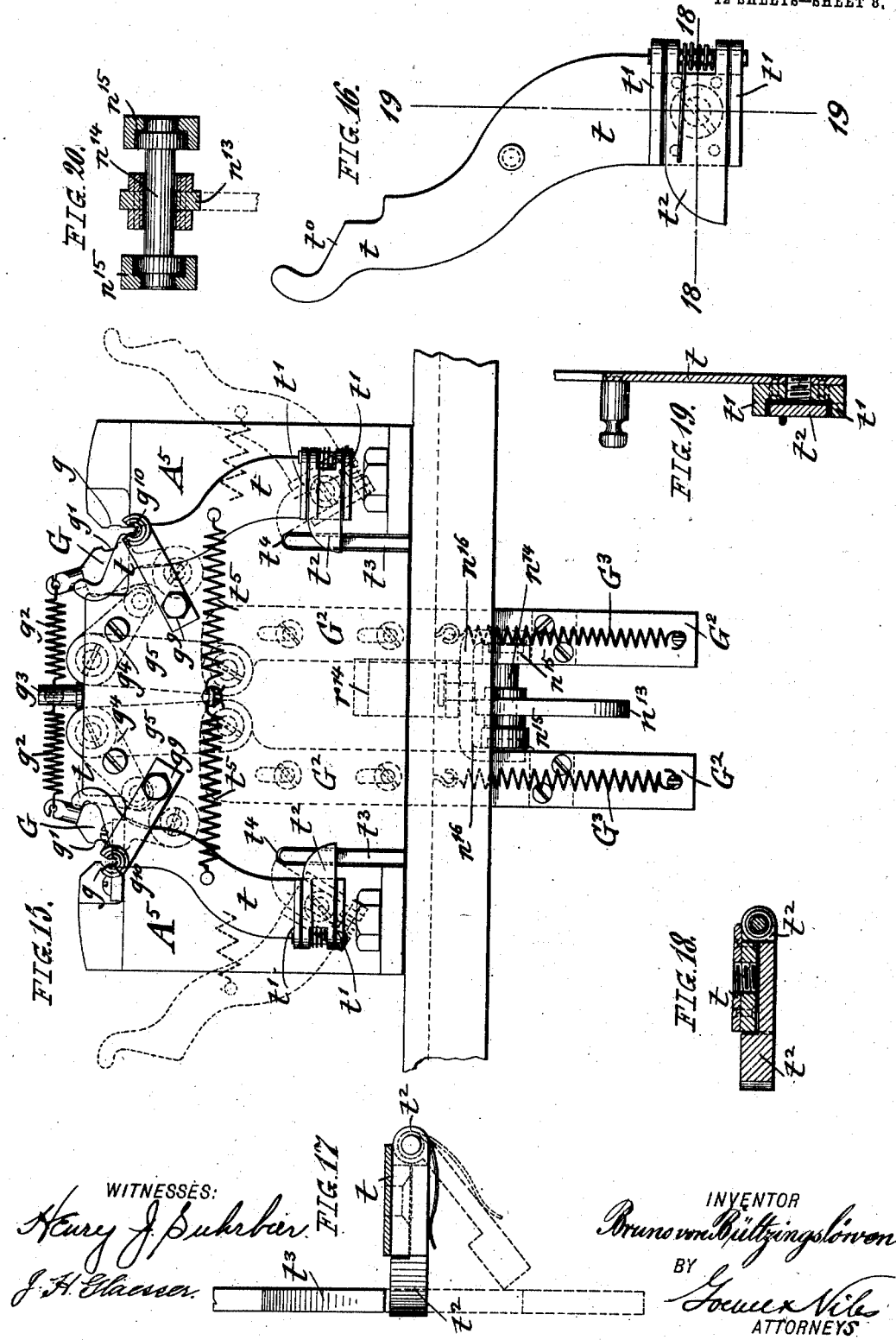

No. 760,100. PATENTED MAY 17, 1904.
B. VON BÜLTZINGSLÖWEN.
MACHINE FOR BENDING THE CROSS HEADS AND EYES OF WIRE BALE TIES.
APPLICATION FILED SEPT. 18, 1903.
NO MODEL. 12 SHEETS—SHEET 9.
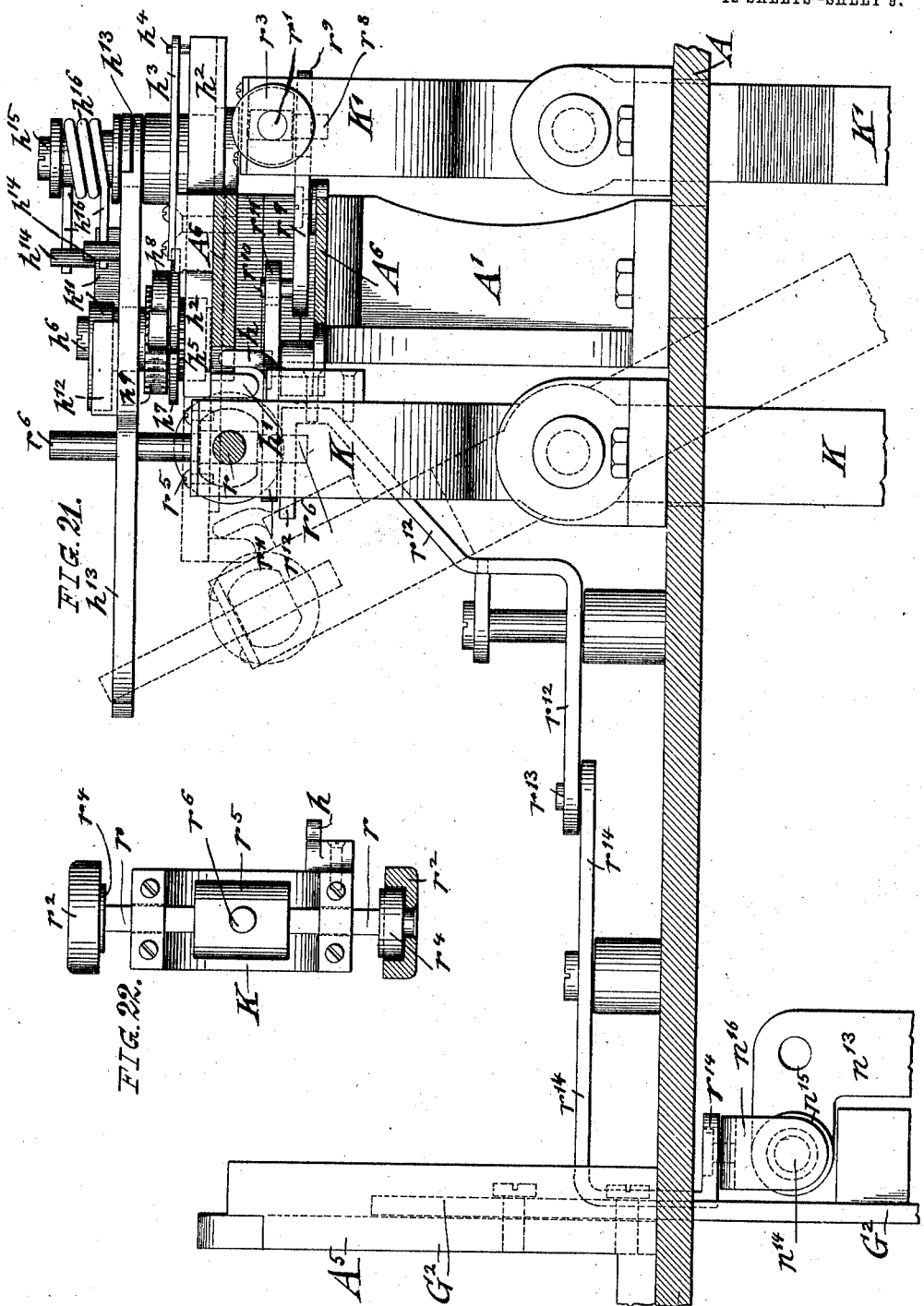

No. 760,100. PATENTED MAY 17, 1904.
B. VON BÜLTZINGSLÖWEN.
MACHINE FOR BENDING THE CROSS HEADS AND EYES OF WIRE BALE TIES.
APPLICATION FILED SEPT. 18, 1903.
NO MODEL. 12 SHEETS—SHEET 10.
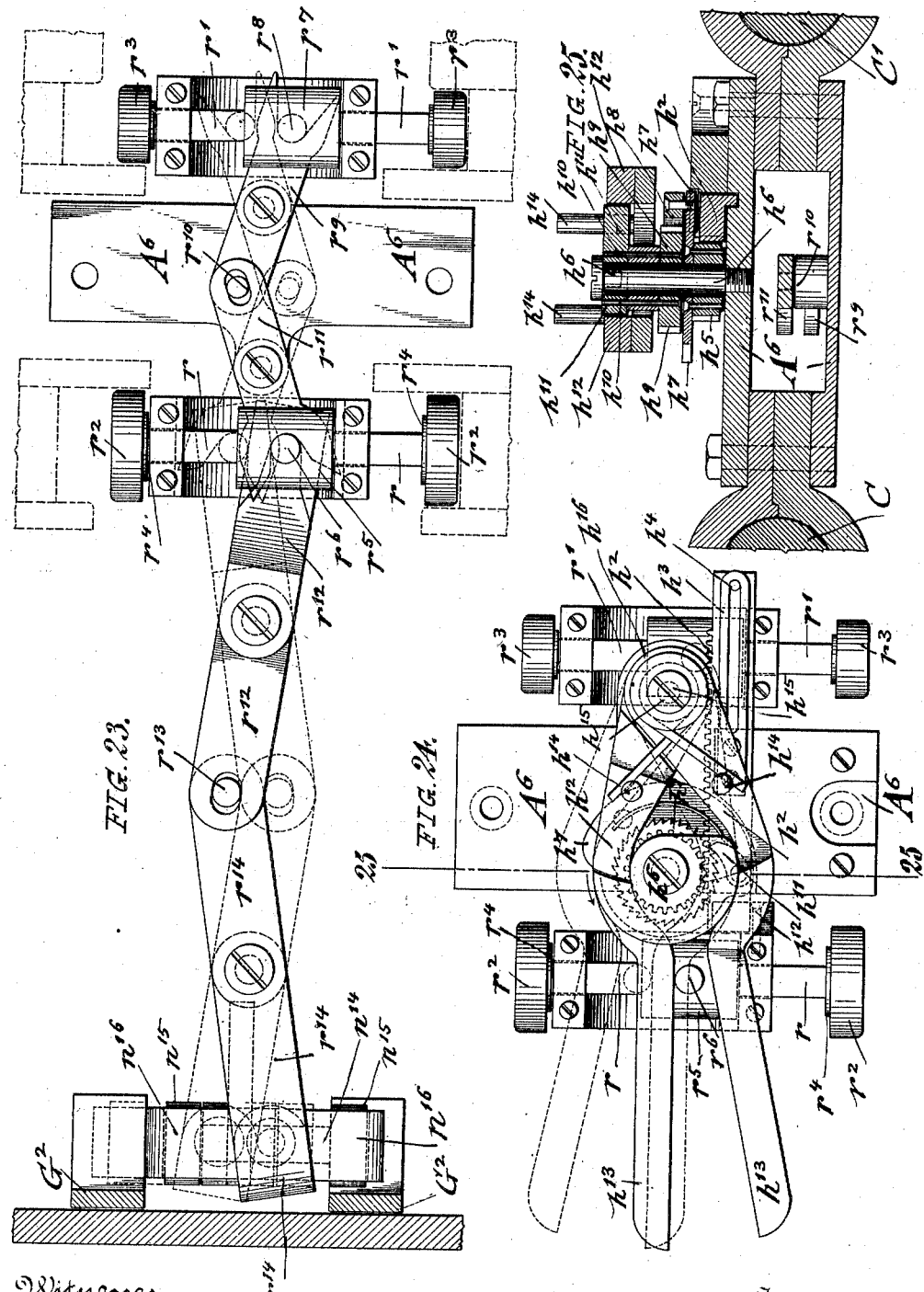

No. 760,100. PATENTED MAY 17, 1904.
B. VON BÜLTZINGSLÖWEN.
MACHINE FOR BENDING THE CROSS HEADS AND EYES OF WIRE BALE TIES.
APPLICATION FILED SEPT. 18, 1903.
NO MODEL. 12 SHEETS—SHEET 11.
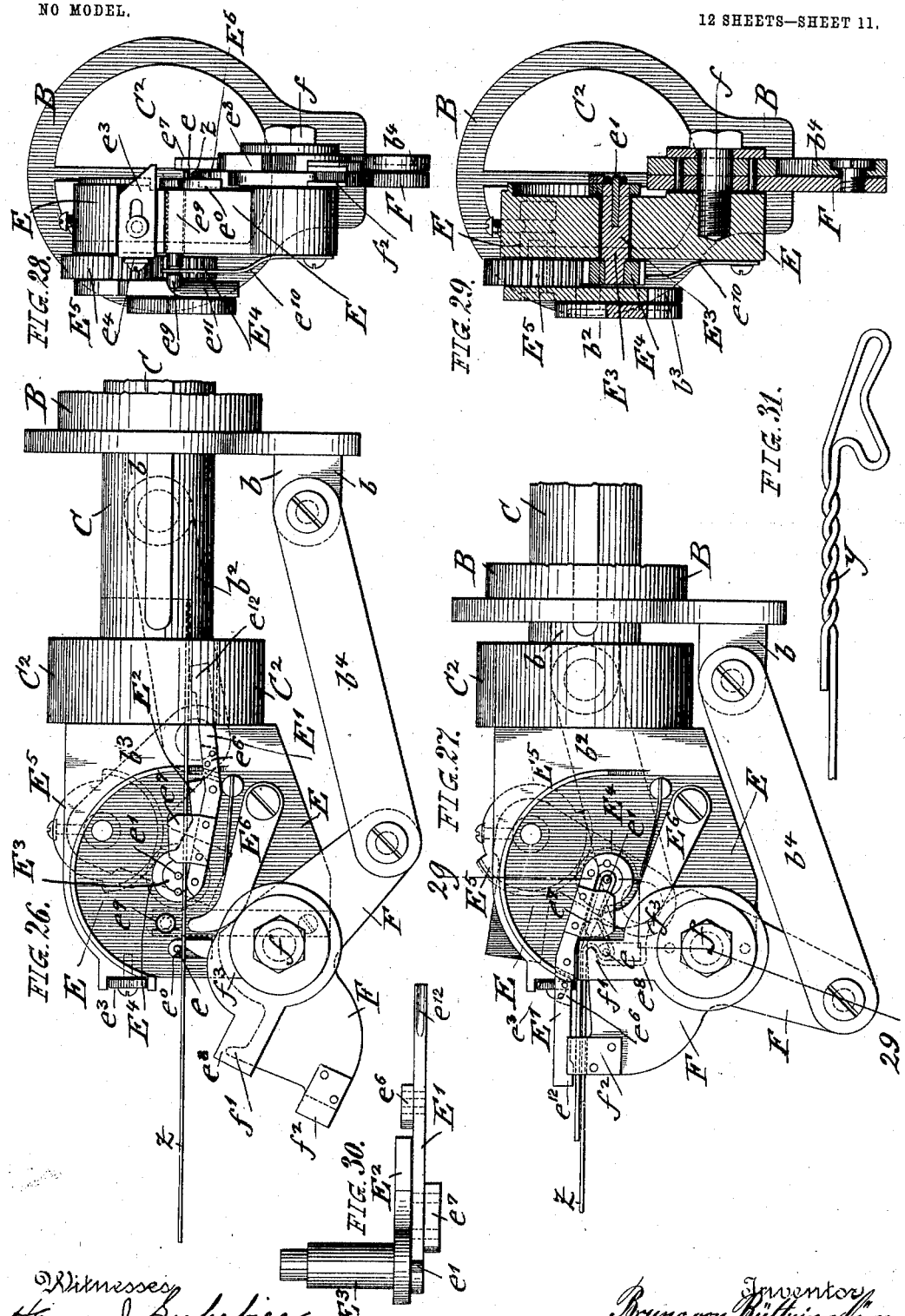

No. 760,100. PATENTED MAY 17, 1904.
B. VON BÜLTZINGSLÖWEN.
MACHINE FOR BENDING THE CROSS HEADS AND EYES OF WIRE BALE TIES.
APPLICATION FILED SEPT. 18, 1903.
NO MODEL. 12 SHEETS—SHEET 12.
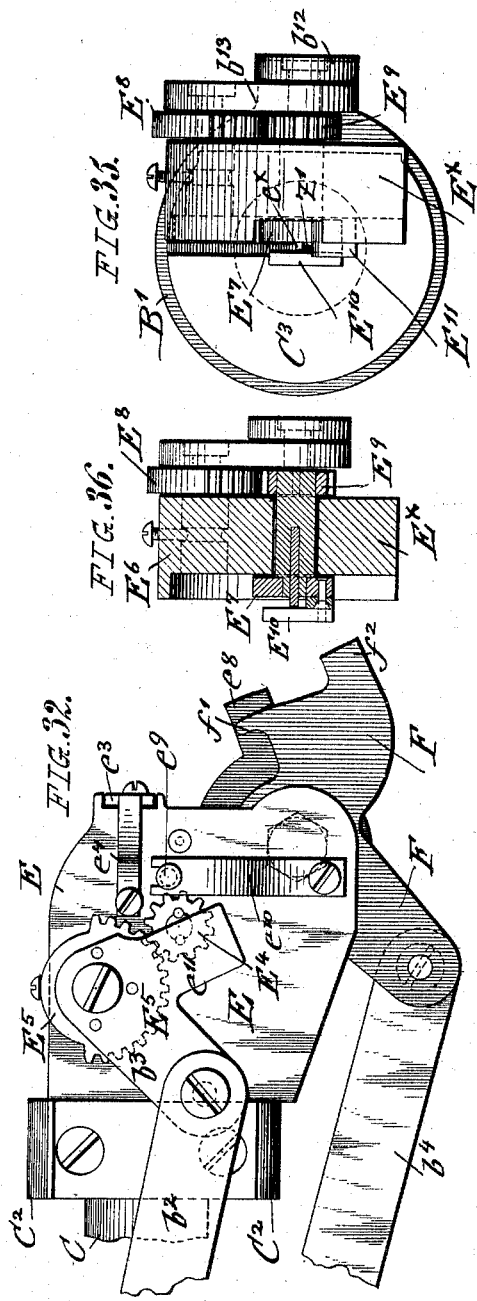
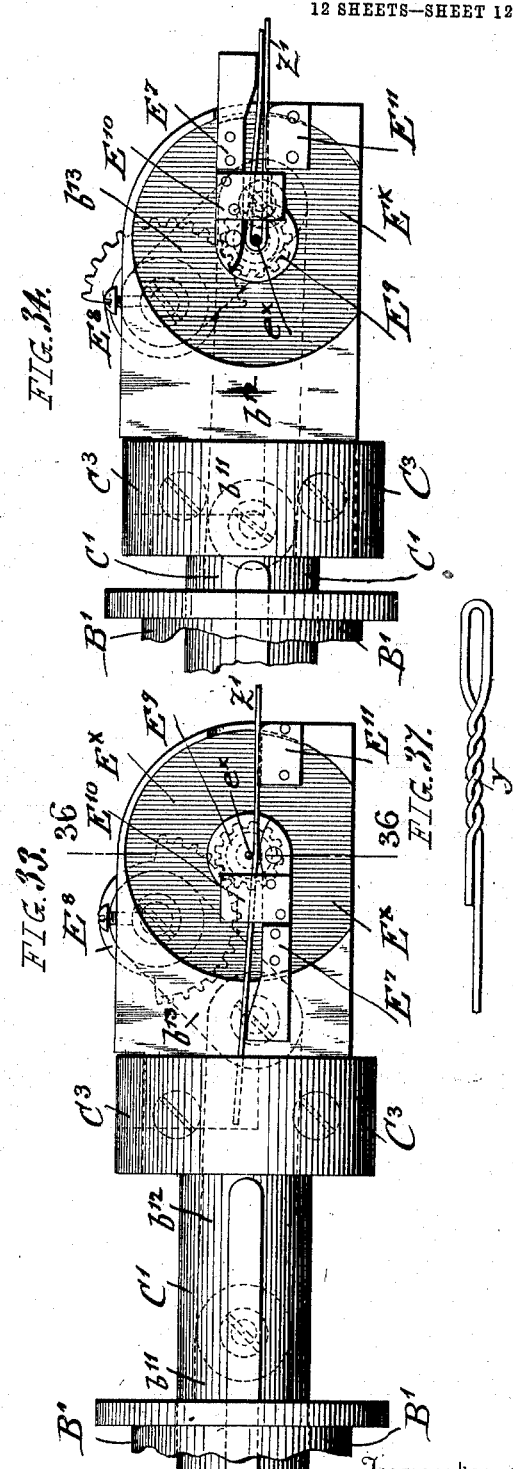

No. 760,100. Patented May 17, 1904.

UNITED STATES PATENT OFFICE.

BRUNO VON BÜLTZINGSLÖWEN, OF NEW YORK, N. Y., ASSIGNOR OF ONE-HALF TO THEODOR SAUER, OF NEW YORK, N. Y.

MACHINE FOR BENDING THE CROSS-HEADS AND EYES OF WIRE BALE-TIES.

SPECIFICATION forming part of Letters Patent No. 760,100, dated May 17, 1904.

Application filed September 18, 1903. Serial No. 173,713. (No model.)

*To all whom it may concern:*

Be it known that I, BRUNO VON BÜLTZINGSLÖWEN, a citizen of the Empire of Germany, residing in New York, borough of the Bronx, and State of New York, have invented certain new and useful Improvements in Machines for Bending the Cross-Heads and Eyes of Wire Bale-Ties, of which the following is a specification.

This invention relates to improvements in machines for bending the cross-heads and eyes of wire bale-ties in such a manner that alternately the end of one wire-blank is bent into the form of a cross-head, while the end of another blank is bent into the form of an eye, the alternating operation of the cross-head or eye bending devices being produced by an automatically-operated power-shifting mechanism, which is located between said bending devices and which also operates, in connection with the same, suitable wire-clamping, shank-twisting, and ejecting devices, so that the finished bale-ties are alternately ejected at opposite sides of the machine; and for this purpose the invention consists, primarily, of the combination, with the cross-head and eye bending devices, the operating-shafts of which are located sidewise of and parallel with each other, of an intermediate automatically-operated power-shifting mechanism, by which the cross-head and eye bending devices are alternately operated.

The invention consists, further, of the combination, with the automatically-operated power-shifting mechanism, of cross-head and eye bending devices, mechanisms for clamping the shanks of the cross-heads and eyes, mechanisms for twisting the shanks, and mechanisms for ejecting the wire bale-ties to one side or the other of the machine after they are bent; and the invention consists, lastly, of certain details of construction and combination of parts, which will be fully described hereinafter and finally pointed out in the claims.

In the accompanying drawings, Figure 1 represents a plan view of my improved machine for bending the cross-heads and eyes of wire bale-ties. Fig. 2 is a bottom view of Fig. 1. Fig. 3 is a side elevation, partly in longitudinal section on a plane midway between the cross-head and eye bending devices. Fig. 4 is a vertical longitudinal section on line 4 4, Fig. 1. Fig. 5 is a vertical longitudinal section through the motion-transmitting shaft of the cross-head or eye bending devices, drawn on a larger scale. Fig. 6 is a vertical transverse section on line 6 6, Fig. 3. Fig. 7 is a detail side view of the compound cam by which motion is transmitted to the operative parts of the machine. Fig. 8 is a plan view of the cam shown in Fig. 7. Fig. 9 is a vertical transverse section on line 9 9, Fig. 3. Fig. 10 is a detail side view of the oscillating lever for actuating the power-transmitting mechanisms for the shank-twisting devices. Fig. 11 is a detail end elevation of the wire-blank-clamping mechanisms, showing it from the inside. Fig. 12 is a sectional side elevation of Fig. 11. Fig. 13 is a plan view of the same. Fig. 14 is a detail side view of one of the clamping-levers of the wire-clamping mechanisms shown in Fig. 11. Fig. 15 is an end elevation of the clamping mechanisms and ejecting devices shown from the outer side. Figs. 16 and 17 are details of one of the ejecting devices. Figs. 18 and 19 are respectively a detail horizontal section on line 18 18 and a vertical transverse section on line 19 19, Fig. 16, of the ejecting device. Fig. 20 is a detail vertical transverse section of the set of shifting heads for the clamping devices. Fig. 21 is a side elevation, drawn on a larger scale and partly in section through the supporting-bridge of the power-shifting mechanism. Fig. 22 is a plan view of the main set of shifting heads of the power-shifting mechanism. Fig. 23 is a detail plan view showing the connection of the power-shifting mechanisms with the wire-blank-clamping devices. Fig. 24 is a detail plan view of the device for alternately shifting the power from the cross-head-bending device to the eye-bending device, and vice versa. Fig. 25 is a vertical transverse section on line 25 25, Fig. 24. Fig. 26 is a detail side elevation of the cross-head-bending device, showing the same in normal or starting position before the beginning of the bending operation. Fig. 27 is a side elevation of the same device, showing it in position at the end of the bending operation. Figs. 28 and 29 are respectively an end elevation of Fig. 26 and a vertical transverse section on line 29 29, Fig. 27, of the cross-head-bending mechanism. Fig. 30 is a detail plan view of the main bending-lever of the cross-head-bending device. Fig. 31 is a side view of a cross-head after the same is finished by its bending device. Fig. 32 is a side elevation of the cross-head-bending device, showing it from the opposite side. Fig. 33 is a side elevation of the eye-bending device, showing it in normal position before the bending operation. Fig. 34 is a side elevation of the same at the end of the eye-bending operation. Fig. 35 is an end elevation of the eye-bending device. Fig. 36 is a vertical transverse section of the same on line 36 36, Fig. 33; and Fig. 37 is a side view of the eye of a wire bale-tie after the same is bent by its bending device.

Similar letters of reference indicate corresponding parts.

By the machine for bending the cross-heads and eyes of wire bale-ties for which I have made an application for Letters Patent on April 16, 1902, Serial No. 103,119, either the cross-head or the eye of a wire-blank could be bent into proper shape by means of suitable bending devices operated by a treadle-operated power mechanism. The cross-head-bending devices were further improved by me, and described and claimed in a second application, filed April 21, 1903, Serial No. 153,678. The main features of these applications are reëmbodied in my present application in connection with certain improvements on the cross-head and eye bending devices; but instead of being operated by a foot-operated treadle they are operated automatically in connection with a power-shifting device by which the cross-head or eye bending devices, which are arranged sidewise of each other, are alternately operated by the power-shifting device, said shifting device transmitting automatically power to one bending device or to the other, so as to complete either a cross-head or an eye at the end of the wire-blank and then eject automatically the so-bent blanks at one side or the other of the machine. The operating-shafts of the cross-head and eye bending devices are arranged parallel with each other on a supporting-table A and sufficiently apart to provide for the arrangement of the power-shifting device between said shafts, the essential parts of the machine being the cross-head-bending device, the eye bending device, the shifting device by which the power is transmitted alternately from the shaft of the cross-head-bending device to the shaft of the eye-bending device, and vice versa, means for clamping the shanks of the cross-head or eye, means for twisting them for completing the cross-head or eye, and means for alternately ejecting the bale-ties after the cross-head or eye is completed at opposite sides of the machine.

*The cross-head-bending device.*—To lugs $a$ on the upper side of the supporting-table A is fulcrumed a rocking lever K, which carries at its forked upper end a laterally-shifting pair of disks or heads, which engage either a sliding sleeve B on the horizontal shaft C of the cross-head-bending device or a sliding sleeve B' on the shaft C' of the eye-bending device. The shafts C C' are arranged sidewise of and parallel with each other and supported in bearings of upright standards A' $A^2$ and $A^3$ $A^4$, which are attached to the table A. The sliding sleeves B B' are placed in engagement with the shafts C C' by suitable spline connections. On the left-hand flanges of the sleeves B and B' are arranged ears $b$ and $b''$, which by means of pivot-link connections serve for operating the primary bending-levers of the cross-head or eye bending mechanisms. To the end of the shaft C is applied a circular head $C^2$, which carries a forwardly-projecting plate E, on which the parts of the cross-head-bending mechanism are mounted. To the plate E is centrally pivoted the arm $E^2$, to which the raised primary bending-lever E' is attached, said lever being bent at an obtuse angle, so as to correspond with the angle of the cross-head toward the wire-blank $z$ to be bent. The arm $E^2$ is attached to a pivot $E^3$, which is journaled in the plate E, as shown in Figs. 26 and 30. A pin $e'$ projects centrally from the forward end of the pivot $E^3$, while a pinion $E^4$, that is engaged by a mutilated gear-wheel $E^5$, is keyed to the opposite end of the pivot $E^3$. The mutilated gear-wheel $E^5$ is pivoted to the plate E and rotated by the forward motion of the sliding sleeve B through the medium of a pivot-link $b^2$, connecting the ear $b$ with the crank $b^3$ of the gear-wheel $E^5$. A second or hook-bending lever F is fulcrumed to a pivot $f$ on the lower part of the plate E and provided with a hook-bending projection or die $f'$, by which the wire-blank $z$ is bent around a stationary pin $e$ on the plate E, so as to form the hook of the cross-head. The pin $e$ is applied by a carrier $e^6$, which is beveled at its front edge for permitting the unobstructed entrance of the wire-blank when inserted into the cross-head-bending device. A convex portion or cam-surface $f^3$ on the hook-bending lever F serves to operate a third bending-lever $E^6$, which is pivoted to the plate E against the tension of a leaf-spring $e^5$, said lever $E^6$ being pivoted to the lower part of the plate E below the bending-lever E' as shown clearly in Figs. 26 and 27. The left-hand end of the bending-lever F is provided with a recessed lug $f^2$, by which the end of the wire-blank $z$, which is bent back over the blank by the bending-lever E', is taken hold of, so as to secure the blank and the bent-over end of the cross-head in proper position by the clamping mechanism which will be described later on. The hook-bending lever F is operated by a pivot-link $b^4$, which connects its lower end or crank with one of the ears $b$ on the flange of the sliding sleeve B. The primary bending-lever E' is provided at its outer end with a longitudinal groove $e^{12}$ for receiving the end of the wire-blank when the same is inserted into the bending devices and into a recess in the end of the shaft D, while a cheek $e^6$, attached to one side of the bending-lever E', serves for actuating a latch $e^3$, that is arranged at the end of the plate E, said latch being under the tension of a flat spring $e^4$, as shown in Figs. 28 and 32. The latch, in connection with the cheek $e^6$ on the bending-lever E', holds the wire-blank $z$ in position during the bending action of the primary bending-lever E' until the outer end of the same enters into the recessed lug $f^2$ at the end of the lever F, as shown clearly in Fig. 27. In addition to the cheek $e^6$ on the primary bending-lever E' is arranged near its pivot, but on the side opposite to the cheek $e^6$, a keeper $e^7$, which during the bending back of the end of the wire-blank is moved over the hook-shaped portion of the cross-head, so as to hold the same in position on its bending-pin $e$ and keep the cross-head in a plane parallel with the plate E, as shown in Fig. 27. Alongside of the second bending-lever F is arranged an oblong keeper $e^8$, which extends sidewise of the hook of the cross-head, while the same is bent so as to hold it in position on its bending-pin and prevent it from becoming detached from the bending devices. The joint operation of the primary bending-lever E', the fulcrumed hook-bending lever F, the bending-lever $E^6$, and the keepers $e^6$, $e^7$, and $e^8$ produces, in connection with the hook-bending pins $e'$ $e$ the formation of the cross-head as shown in Fig. 27. On the plate E is arranged above the end of the second bending-lever $E^6$ a pusher $e^9$, which passes through the plate E and which is set to tension at the opposite side of the same by a flat spring $e^{10}$. The forked upper end of the spring $e^{10}$ engages a circular groove on the rear end of the pusher, as shown in Fig. 28. The rear end of the pusher $e^9$ is beveled and engaged by the beveled edge of a downwardly-extending arm $e^{11}$ on the elbow-shaped operating-crank $b^3$ of the mutilated pinion $e^5$, as shown in Fig. 28, so that the beveled edge engages the rear end of the pusher at the proper time after the cross-head-bending devices are returned from their bending position into their normal or starting position, so that the pusher $e^9$ is moved sidewise and releases the bent cross-head from the bending-pins ready for the action of the ejecting devices. When the cross-head-bending operation is completed, the wire-blank and the overlapping bent-over end of the cross-head are firmly gripped by a clamping device preparatory to the twisting operation that is to be imparted to the shank of the cross-head. The clamping device is arranged at the end of the table A in line with the cross-head-bending devices and consists of an upright standard $A^5$, which is attached at its lower end to the table A, and a clamping-cheek G, pivoted to the standard, as shown in Fig. 11. The upper end of the standard $A^5$ is recessed at its inner face, so as to form a die $g$, which forms, in connection with a similar recess or die $g'$ on the clamping-cheek G, the support for the shank of the cross-head. The upper end of the clamping-cheek G is connected by a helical spring $g^2$ with a pin $g^3$ at the center of the supporting-standard $A^5$, so as to be held normally away from the die $g$ of the standard $A^5$. Oscillating motion is imparted at the proper time to the clamping-cheek G by a fulcrumed lever $g^4$, which is connected by a pivot-link $g^5$ with a vertically-guided slide-rod $G^2$, that is actuated in connection with the power-shifting mechanism to be hereinafter described, so as to apply an antifriction-roller $g^6$ at the lower end of the lever $g^4$ to the clamping-cheek G on the lowering of the slide-rod $G^2$. The slide-rod $G^2$ is guided by means of slots $g^7$ on headed studs $g^8$ on the standard $A^5$ and passed through an opening in the table A to some distance below the same. The slide-rod $G^2$ and the parts connected therewith are returned into their normal position by helical springs $G^3$. To the standard $A^5$ is attached by an arm $g^9$ a longitudinally-grooved guide-socket $g^{10}$, which serves for guiding the wire-blank $z$ when the same is inserted into the bending devices, the groove of said socket being located in line and in the same vertical plane with the dies $g$ $g'$ when they are in their closed position. These parts are clearly shown in Figs. 11 to 14.

*The eye-bending devices.*—The eye-bending devices are shown in Figs. 33 to 36. They are supported on the head $C^3$ of the shaft $C'$, sidewise of the cross-head-bending devices, and consist of a supporting-plate $E^X$, an eye-bending lever $E^7$, that is centrally pivoted to the plate $E^X$ similar to the primary bending-lever E' of the cross-head-bending device, and intermediate motion-transmitting mechanism for the lever $E^7$, consisting of a mutilated gear-wheel $E^8$ and a pinion $E^9$, which are actuated by the sliding sleeve B' on the shaft $C'$, and an intermediate pivot-link $b^{12}$, connecting the ear $b^{11}$ on the sleeve B' with the crank $b^{13}$ of the mutilated gear-wheel $E^8$. The eye-bending lever $E^7$ is provided with a keeper $E^{10}$, that projects over the wire-blank and holds it in position while its end is bent around the projecting center pin $e^X$ of the pivot of the lever, as shown in Fig. 34. The plate $E^X$ is provided at its front end in line with the face of the bending-lever $E^7$ with a cheek $E^{11}$, which is grooved at its upper edge and rounded off at its front corner, so as to permit the easy insertion of the blank $z'$ and give a proper support for the same during the bending operation. When the end of the wire-blank $z'$ has been bent around the center pin, as shown in Fig. 34, the shank of the eye thus formed is taken hold of by a second set of clamping devices $g$ G $g'$, which are in line with the eye-bending devices and are of the same construction as the clamping devices for the cross-head. The shank of the eye is then firmly held in position by the clamping devices ready for the twisting motion which is imparted to the shaft of the eye-bending devices by the automatic action of the machine.

*The shank-twisting mechanism.*—The twisting operation of the shanks $y$ of the cross-heads or eyes is accomplished by the following mechanism: On the main shaft C of the cross-head-bending devices is mounted a loose pulley P, which is thrown at the proper time into operative connection with said shaft by a suitable clutch device $p$, as shown in Figs. 1 and 3. The pulley P receives continuous rotary motion by a belt from an overhead power-shaft and transmits it by a sprocket-wheel $w$ and a sprocket-chain $w'$ to a loose sprocket-wheel $w^2$ on the shaft C' and by a third sprocket-wheel $w^3$ to an intermediate shaft S, which is supported in bearings at the under side of the table A, as shown in Figs. 1 and 9. An adjustable idler $w^5$ keeps the sprocket-chain $w'$ taut, so that continuous rotary motion is imparted to the different sprocket-wheels $w$, $w^2$, and $w^3$. On the opposite end of the shaft S is mounted a bevel-pinion $w^6$, which meshes with a loose bevel gear-wheel $w^7$ on the outer end of a shaft S', that is supported at right angles to the shaft S, the bevel gear-wheel $w^7$ being thrown into mesh with the shaft S' by a spring-cushioned clutch $p'$, as shown in Fig. 6, which is operated by a foot-operated treadle mechanism whenever the machine is to be operated. On the inner end of the shaft S' is mounted a compound cam N, by which the lever K and the cross-head and eye-bending devices are actuated. The sprocket-chain $w'$ and the sprocket-wheels $w$, $w^2$, and $w^3$ are kept continuously in motion as long as the belt is on the pulley P. The rear ends of the main shafts C and C' are made tubular, as shown in Figs. 5 and 6, and provided with shiftable rods $m$, which are connected by transverse coupling-pins $m'$ with the sliding sleeves $B^3$ $B^4$ on the shaft C C'. On the rear ends of the shafts C and C' are mounted sliding sleeves $B^5$ $B^6$, which are also connected by coupling-pins $m^2$ with the shafts C C'. The flanges of the sliding sleeves $B^5$ $B^6$ adjacent to the standards $A^2$ and $A^4$ are provided at their lower parts with holes $m^3$, which are held in engagement with stationary pins $m^4$ on said standards, as shown in Figs. 3, 4, and 5, by the tension of helical springs $m^5$, which are interposed between the hubs of the sliding sleeves $B^3$ and $B^4$, the hub of the power-pulley P on the shaft C and a collar $m^\times$ on the shaft C', as shown in Fig. 5. The clutch member of the sprocket-wheel $w^2$ and the sliding sleeve $B^4$ are adapted to be coupled by a coupling device $p^2$, so as to impart rotary motion to the shaft C' whenever the sliding sleeve $B^4$ is coupled to the hub of the sprocket-wheel $w^2$. In both cases, whether the sliding sleeve $B^3$ or the sliding sleeve $B^4$ is coupled to the hub of the pulley P or the hub of the sprocket-wheel $w^2$, the sliding sleeve $B^5$ or the sliding sleeve $B^6$ on the rear ends of the shafts C or C' is shifted by their connecting-rods $m$ and coupled by clutch devices $p^3$ $p^4$ with loose sprocket-wheels $w^8$ $w^9$ on the rear ends of the shafts C C', so that rotary motion is transmitted from either sprocket-wheel $w^8$ or $w^9$ by a sprocket-chain $w^{10}$ to a fast sprocket-wheel $w^{11}$ on the shaft $S^2$. The sprocket-chain $w^{10}$ is kept taut by an adjustable idler $w^{12}$ in the same manner as the sprocket-chain $w'$. The ratio between the teeth of the sprocket-wheels $w^8$ and $w^9$ and the teeth of the sprocket-wheel $w^{11}$ is one to three, so that for each rotation of the larger sprocket-wheel $w^{11}$ three rotations of the sprocket-wheels $w^8$ and $w^9$, and consequently three rotations to the shaft C or C' are imparted. This produces three rotations of the cross-head or eye bending devices, and consequently, as their shanks are held by one of the clamping devices, three twists to the same, as shown in Figs. 31 and 37. The power-transmitting mechanisms for the shank-twisting devices are called into operation by the action of the compound cam N and the oscillating motion of the lever K' imparted thereby, said oscillating lever producing by the action of the power-shifting mechanism and intermediate couplings either the shifting of the sliding sleeve $B^3$ into mesh with the pulley P or the shifting of the sliding sleeve $B^4$ into mesh with the clutch member of the sprocket-wheel $w^2$, and thereby by the sprocket-wheel and chain transmissions either three rotations of the shaft C or of the shaft C' and three corresponding twists to the shanks of the cross-head or eye just bent by their bending devices. The required oscillating motion is imparted to the levers K and K' at the proper time by the compound cam N as soon as rotary motion is transmitted to the shaft S of the same by the clutch $p'$ and bevel gear-wheel $w^7$. The compound cam N performs four different functions: First, by an antifriction-roller $n$ on its face it engages the lower end of the fulcrumed lever K, by which the cross-head and eye bending devices are operated; secondly, by a lug $n'$ projecting from the same, it engages an elbow-lever $K^2$, by which the lever K' and the friction-clutches on the main shafts C C' are thrown into action, so as to produce the twisting of the shanks of the cross-heads or eyes; thirdly, by a second projecting lug $n^2$, which engages the lug $n^6$ of a horizontally-guided slide-piece $n^4$, carrying an antifriction-roller $n^5$, the lever K is returned positively into its normal or starting position without requiring a return-spring for this purpose, and, fourthly, by a segmental portion $n^3$ on the circumference of the cam the wire-clamping devices are actuated at the proper time so as to hold the shank of the cross-head or eye firmly in position for the shank-twisting operation. The elbow-lever $K^2$, which is acted upon by the lug $n'$, is fulcrumed to a stationary hanger $K^3$ and carries on its lower arm an antifriction-roller $n^7$, that acts on the lower end of the lever $K'$, as shown in Figs. 3 and 9, while the slide-piece $n^4$ is guided in dovetailed guideways of a bracket $n^8$, which is attached to the under side of the table A, as shown in Figs. 2, 3, and 6. The oscillatory motion of the lever K produced by the roller $n$ carries the slide-piece $n^4$ and its friction-roller $n^5$ along, as shown in dotted lines in Fig. 3, while the lug $n^2$, acting on the lug $n^6$ of the slide-piece $n^4$, returns the slide-piece and by the roller $n^5$ the lever K into its initial position ready for the next action of the compound cam N. The segmental portion $n^3$ of the cam N acts on an antifriction-roller $n^9$ of a lever $n^{10}$, which is fulcrumed to a bracket-plate $n^{11}$ at the under side of the table A, (shown in Fig. 2,) the opposite end of said lever being connected by a pivot-link $n^{12}$ with a spring-actuated lever $n^{13}$, that is also fulcrumed to the bracket-plate $n^{11}$ and that carries in its opposite end a laterally-shifting rod $n^{14}$, the enlarged heads $n^{15}$ of which are engaged by a U-shaped keeper or bail $n^{16}$, (shown in Figs. 2, 3, 11, and 21,) that is connected with and shifted by the power-shifting device, so as to actuate either the clamping device of the cross-head or the clamping device of the eye-bending mechanism. The lug $n'$ of the cam N acts on the tapering end of the fulcrumed elbow-lever $K^2$, so as to swing the same into the position shown in dotted lines in Fig. 3, and serves to oscillate the lever $K'$, so that its upper end throws the clutch $p$ into mesh with the hub of the pulley P or the clutch $p'$ into mesh with the clutch member of the sprocket-wheel $w^2$. By the oscillation of the lever $K'$ a pin $m^5$, supported on the same by an adjustable keeper $m^6$, is withdrawn from a socket $m^7$ in a disk M, so that the latter can follow the rotations imparted to it by the shaft of the sprocket-wheel $w^{11}$, causing the disk M to make one rotation, so as to impart by the sprocket transmission $w^{10}$ and $w^8$ or $w^9$ three full twists to the shank of the cross-head or eye. When the disk M has completed its rotation, the pin $m^5$ is returned, by the tension of the helical spring $m^8$ acting on the lower end of the lever $K'$, into engagement with the socket $m^7$ and simultaneously therewith the flange of the sliding sleeve $B^5$ or $B^6$ into engagement with the stop-pin $m^4$ on the standard $A^2$ or $A^4$, so that the shaft C or $C'$ is locked into proper position for holding the cross-head or eye bending devices on the front end of the same in vertical position and in proper alinement with the wire-blank holding and clamping devices.

*The power-shifting mechanism.*— The power-shifting mechanism is shown in detail in Figs. 21 to 25. It is located between the shafts C and $C'$ and supported on a transverse bridge $A^6$, connecting the standards $A'$ $A^3$. The bridge $A^6$ is formed of an upper end and a lower plate, between which an open space is formed. The power-shifting mechanism is operated by the fulcrumed lever K, the forked upper end of which carries a laterally-shifting rod $r$, provided with enlarged heads $r^2$, as shown in Figs. 10, 22, 23, and 24, said heads being capable of turning freely on collars $r^4$ on the ends of the rod $r$. At the center of the laterally-shifting rod $r$ intermediately between the forked end of the lever K is arranged a collar $r^5$, which carries a pin $r^6$, which extends above and below the collar $r^5$ and locks it to the rod $r$, so as to move laterally with the same. To the upper end of the fulcrumed lever K is applied a catch-hook $h$, which engages a downwardly-extending lug $h'$ at the front end of a horizontally-reciprocating rack $h^2$, its slotted rear end $h^3$ being guided on a pin $h^4$ on the upper plate, as shown in Figs. 21, 24, and 25. The reciprocating rack $h^2$ is moved in forward direction by the lever K when the same is operated by the compound cam N in the manner before described. During the forward motion of the rack no action is exerted on the power-shifting mechanism; but during the return motion of the fulcrumed lever K from the position shown in dotted lines in Fig. 21 to its normal or starting position the rack $h^2$ is moved in backward direction, so that it engages with and rotates a pinion $h^5$, that is placed loosely on a pivot-pin $h^6$, which is supported on the upper plate of the stationary bridge $A^6$, extending between the supporting-standards $A'$ $A^3$ of the cross-head and eye bending devices. To the pinion $h^5$ is attached, by means of suitable fastening-pins, a disk $h^7$, which carries a pivoted and spring-actuated pawl $h^8$, that engages a ratchet-wheel $h^9$. The ratchet-wheel $h^9$ is placed loosely on the same pivot $h^6$ as the pinion $h^5$ and connected by fastening-pins $h^{10}$, with the under side of a segmental cam $h^{11}$, that is superposed above the ratchet-wheel. The segmental cam $h^{11}$ is located between the raised and curved cheeks $h^{12}$ on the shanks of two levers $h^{13}$, that are pivoted at their rear ends to a stationary pivot-pin $h^{15}$ on the upper plate of the bridge $A^6$, both levers being subjected to the tension of a coil-spring $h^{16}$, the outer ends of which are placed in contact with pins $h^{14}$ on said levers, as shown clearly in Fig. 24. The segmental cam $h^{11}$ acts, according to the position imparted to the same by the pawl and ratchet-wheel, either on the raised shank $h^{12}$ of one or the other lever $h^{13}$ and produces thereby, by the lateral motion of the lever, the shifting of the transverse rod $r$, under the tension of the spring $h^{16}$ exerted on the other lever, from the position shown in dotted lines into the position shown in full lines in Fig. 24. As the segmental cam $h^{11}$ under the influence of the transmitting mechanism, consisting of rack $h^2$, pinion $h^5$, and pawl-and-ratchet device $h^8$ $h^9$, makes one-half of a rotation it will when it arrives at the end of its motion engage the raised portion on the shank of the opposite lever, so that the levers assume the position shown in dotted lines in Fig. 24. During the shifting motion of the levers $h^{13}$ the upright center pin $r^6$ on the laterally-shifting rod $r$ is placed in position between the ends of the levers, so as to be engaged by the same and produce thereby the lateral shifting of the rod $r$, so that one of its heads $r^2$ or the other is brought into engagement with the sliding sleeve B or B' on the shaft C or C'. By the next forward motion of the main lever K the bending device with which the head $r^2$ is then in mesh is operated, while the other bending device remains at rest. By the forward motion of the main lever K, however, the rack has been moved forward by the hooks $h$ $h'$, so that by the next return motion of the main lever and the consequent actuating of the power-shifting device the lateral motion of the levers $h^{13}$ and the shifting of the transverse rod $r$, with its head $r^2$, into mesh with the sleeve on the shaft of the other bending device is produced, and thereby the second bending device operated while the bending device just operated is at rest. The laterally-shifting motion of the heads, by which they are alternately thrown into engagement with the sliding sleeve of the shaft of the cross-head or the sliding sleeve of the eye-bending device, takes place alternately by the automatic action of the power-shifting mechanism. A second shifting rod $r'$, which is carried by the upper forked end of the lever K', as shown in Figs. 10, 23, and 24, is provided with a central collar $r^7$, having a downwardly-extending pin $r^8$, which is engaged by the forked end of a lever $r^9$, that is fulcrumed to the lower plate of the bridge A$^6$ and connected by a pin $r^{10}$ at its opposite end with a second fulcrumed lever $r^{11}$, the opposite forked end of which is engaged by the lower end of the pin $r^6$ of the slide-rod $r$. This double-lever connection $r^9$ $r^{11}$ of the rod $r$ with the rod $r'$ shifts the latter simultaneously with the former, so as to engage by its heads $r^3$ either the sliding sleeve B$^3$ on the shaft C or the sliding sleeve B$^4$ on the shaft C' and produce the actuation of the shank-twisting mechanisms of the cross-head or eye after they are bent by their bending mechanisms. The lower end of the pin $r^6$ of the laterally-shifting rod $r$ also engages the forked end of a third downwardly-bent lever $r^{12}$, that extends in forward direction and is fulcrumed to the table A in front of the lever K, as shown in Figs. 21 and 23. The lever $r^{12}$ engages by its slotted front end a pivot $r^{13}$ on a fourth lever $r^{14}$, that is also fulcrumed to the table A and pivotally connected by its downwardly-bent front end with the U-shaped keeper $n^{16}$, which carries the laterally-shifting rod $n^{14}$ (shown in Figs. 3, 11, and 23) on the front end of the elbow-lever $n^{13}$, so as to produce simultaneously with the shifting of the rods $r$ and $r'$ the shifting of the rod $n^{14}$, and thereby by one or the other of its heads $n^{15}$ the actuation either of the clamping devices for the shank of the cross-head or of the eye, so as to hold them firmly in position for the action of the twisting mechanism, as before described.

*The ejecting devices.*—The ejecting devices are shown in Figs. 15 to 19. They are located on the upright standard A$^5$ of the clamping devices on the front side of the same. They consist of oscillating lever-arms $t$, that are fulcrumed at their lower ends to the upright standard A$^5$. The lower end of each ejector-arm is provided with parallel ribs $t'$, to which is hinged a spring-actuated latch $t^2$, that projects inwardly beyond the inner edge of the ejector-arm and that is rounded at the inner end, so as to be engaged by a horizontally-reciprocating slide-piece $t^3$, which is guided in a vertical slot $t^4$ on the standard A$^5$ at right angles to the latter. The front end of the reciprocating slide-piece $t^3$ is straight and then inclined in downward direction, as shown in dotted lines in Fig. 12. The front end of the slide-piece $t^3$ engages the spring-actuated latch $t^2$ on the ejector-arm $t$ when moved in forward direction, so as to turn the latch sidewise into the position shown in dotted lines in Fig. 17. The latch is swung forward against the tension of its spring from its normal position between the ribs $t'$ until the front end of the slide-piece $t^2$ permits it to swing back again into its former position. On the return motion of the slide-piece $t^3$ the inclined portion $t^0$ of the front end engages the latch $t^2$ and moves it, with the ejector-arm, quickly in lateral direction into the position shown in dotted lines in Fig. 15, so as to eject the bent bale-wire, which is moved quickly along the curved and inclined upper edge of the ejector-arm $t$. As soon as the ejecting action has taken place the ejector-arm $t$ is returned with the latch $t^2$ by its helical spring $t^5$ into its normal position, as shown in full lines in Fig. 15, it being arrested by a shoulder on the inner side of the guide-carrying arm $g^9$. The reciprocating slide-pieces $t^3$ are provided with upwardly-extending arms $t^6$, which are engaged, respectively, by the sliding sleeves B B' on the shafts C C' of the cross-head and eye bending devices, respectively, as shown in Fig. 3, so as to move forward with the sliding sleeves during the bending operation for operating the latches and return quickly with the sleeves after the twisting operation of the shanks is accomplished, so as to quickly actuate the ejectors during the return motion, throw thereby the bent wire bale-ties to either side of the machine, and then return the ejector-arms into their normal position.

Operation: The operation of my improved machine for bending the cross-heads and eyes of wire bale-ties takes place as follows: After inserting the wire-blank z into position in the guide devices and cross-head-bending mechanism, as shown in Fig. 26, and placing the power-belt on the pulley P the treadle is depressed so that the compound cam is turned, and thereby the main lever K moved into the position shown in dotted lines in Fig. 3. By the oscillation of the main lever K the sliding sleeve C is shifted on the main shaft B, so as to operate by the intermediate motion-transmitting mechanism the bending-levers and the hook-forming die and bend thereby the end of the wire-blank z into the shape of the cross-head shown in Fig. 31. The end of the wire-blank is first bent around the bending-pin by the action of the raised bending-lever, after which the hook-forming die commences to move; but it does not act on the wire-blank until the bending motion performed by the bending-lever is nearly completed, so as to prevent thereby any shifting or unusual strain on the wire-blank when the hook-forming die commences its work. Simultaneously with the action of the hook-forming die the second bending-lever is actuated, so as to complete thereby the shape of the cross-head. As soon as the end of the wire-blank is bent over the retaining-latch, lugs, and keepers act on the bent-over end and hold it in position for the action of the bending-levers and hook-forming die. The wire-blank, as well as the completed cross-head, is thereby securely held against any lateral movement during the subsequent clamping and twisting operations. As soon as the bending operation is completed the shank of the cross-head is taken hold of by the clamping devices ready for the operation of the shank-twisting mechanism. The bending of the wire into the form of a cross-head, the clamping of the shank of the same, and the twisting of the shank are so timed as to take place in proper succession by the action of the compound cam N on the main levers K K' and on the clamping devices and shank-twisting mechanisms, as herein described. On the return of the main lever K and the bending devices into their normal or starting positions the cross-head at the end of the wire bale-tie is released from the bending devices by the spring-actuated and laterally-movable pusher and made ready for the action of the ejector, which is operated by the return motion of the sliding sleeve B, so as to throw the bale-tie, with the cross-head formed thereon, quickly sidewise out of the machine. Simultaneously with the return of the actuating main levers K K' into their former position and the realinement of the shaft C with the clamping devices the power-shifting mechanism is operated by the lever K in the manner before described, and thereby the power shifted by the shiftable heads of the levers K K' from the shaft C of the cross-head-bending devices to the shaft C' of the eye-bending devices, the shaft C remaining in a position of rest. By the next oscillating motion of the main levers K K' by the compound cam the shifting sleeve B' on the main shaft C' is moved in forward direction, so as to act on a second wire-blank inserted into the eye-bending devices and bend its end back, which is then taken hold of by the clamping devices and the shank, then next twisted by the action of the shank-twisting mechanism. By the return motion of the levers K and K' into their normal position the ejector of the wire bale-tie just bent is operated by the sleeve B' and the bale-tie with the eye bent at the end thereof ejected automatically to the opposite side of the machine. The return motion of the main lever K produces again the operation of the power-shifting mechanism, so as to place the shiftable heads of the levers K K' into engagement with the sleeves on the shaft C and produce by the next motion of the main levers K K' the actuation of the cross-head-bending, wire-clamping, shank-twisting, and ejecting devices, and so on alternately the formation of cross-heads and eyes at the ends of wire-blanks and their ejection at opposite sides of the machine.

The machine hereinbefore described is arranged with cross-head and eye bending devices, which are alternately operated by the automatically-operated power-shifting mechanism. It is obvious, however, that one machine may be made with two cross-head-bending devices and another machine with two eye-bending devices, each of which machines is operated alternately by its power-shifting mechanism in the same manner as in the machine hereinbefore described.

The improved machine for bending the cross-heads and eyes of wire bale-ties has the advantage that by the automatic actuation of its operative parts and the automatic shifting of the power from the shaft of the cross-head-bending devices to the shaft of the eye-bending devices after the machine is started by the depression of a foot-operated treadle a very large number of bale-ties can be completed within a given time, the machine requiring only one attendant for feeding the wire-blanks alternately to the bending devices, while the remaining operations are accomplished by the automatic action of the machine.

Having thus described my invention, I claim as new and desire to secure by Letters Patent—

1. In a machine for bending the cross-heads and eyes of wire bale-ties, the combination, with separate cross-head and eye bending devices arranged sidewise of each other, of a power-shifting mechanism located between the same adapted to throw alternately one or the other of the bending devices into or out of operation, substantially as set forth.

2. In a machine for bending the cross-heads and eyes of wire bale-ties, the combination, with separate cross-head and eye bending devices arranged sidewise of each other, of wire-clamping devices in line with said bending devices, and a power-shifting mechanism located between said bending and wire-clamping devices and adapted to throw one set of bending and wire-clamping devices or the other into or out of operation, substantially as set forth.

3. In a machine for bending the cross-heads and eyes of wire bale-ties, the combination, with separate cross-head and eye bending devices, arranged sidewise of each other, separate wire-clamping devices in line with the bending devices and shank-twisting mechanisms of a power-shifting mechanism, located between said bending devices and wire-clamping devices and adapted to throw alternately one or the other of the bending and clamping devices and the shank-twisting devices into or out of operation, substantially set forth.

4. In a machine for bending the cross-heads and eyes of wire bale-ties, the combination, with separate cross-head and eye bending devices, separate wire-clamping devices in line therewith, shank-twisting mechanisms and ejecting devices, of a power-shifting mechanism located between said bending and wire-clamping devices and adapted to throw one set or the other of the bending, wire-clamping, shank-twisting, and ejecting devices into or out of operation, substantially as set forth.

5. In a machine for bending the cross-heads and eyes of wire bale-ties, the combination of a supporting-plate for the cross-head-bending devices, a center pin on the same, a primary bending-lever, means for rotating the same, a second bending-lever, a hook-bending lever, means for operating the hook-bending lever at the proper time, a stationary hook-bending pin on the supporting-plate, retaining devices for the cross-head arranged on the primary and hook-bending levers, a transversely-guided and spring-actuated pusher, and means for operating the pusher at the proper time for releasing the finished cross-head from the bending devices, substantially as set forth.

6. In a machine for bending the cross-heads and eyes of wire bale-ties, the combination, of a supporting-plate for the cross-head-bending devices, a center pin on the same, a primary bending-lever, means for rotating the same, a second bending-lever below the primary lever, a fulcrumed hook-bending lever provided with a cam for actuating the second bending-lever, means for rotating the hook-bending lever, keepers on the primary and hook-bending levers for retaining the wire-blank during the bending operation, a stationary hook-bending pin on the supporting-plate, a transversely-guided and spring-actuated latch, a cheek on the primary bending-lever for engaging said latch, a laterally-guided and spring-actuated pusher, and means for actuating said pusher and releasing the finished cross-head at the proper time after the bending devices are returned into their initial position, substantially as set forth.

7. In a machine for bending the cross-heads and eyes of wire bale-ties, the combination, with a supporting-plate for the bending devices, of a primary bending-lever pivoted to said plate, a center pin on said plate, a second bending-lever below the stationary hook-bending pin, a hook-bending lever fulcrumed to the supporting-plate, a cam on said lever for operating the second bending-lever, means for rotating the hook-bending lever independently of the primary lever, keepers on the primary and hook-bending levers for retaining the bent-over wire in position, recessed lugs on the ends of the primary and hook-bending levers, and a laterally-guided and spring-actuated pusher for releasing the finished cross-head at the proper time, substantially as set forth.

8. In a machine for bending the cross-heads and eyes of wire bale-ties, the combination, with separate cross-head and eye bending devices and mechanism for operating the same, said bending devices being arranged sidewise of each other, of a power-shifting mechanism located between said bending devices, and composed of a rack-and-pinion mechanism operated by the actuating mechanism of the bending devices, laterally-shiftable heads, and mechanism between the rack-and-pinion mechanism and the laterally-shiftable heads for moving one head or the other into engagement with one or the other of the bending devices, substantially as set forth.

9. In a machine for bending the cross-heads and eyes of wire bale-ties, the combination, with separate cross-head and eye bending devices arranged sidewise of each other and mechanism for actuating the same, of a power-shifting mechanism located between said bending devices and operated by said actuating mechanism, said power-shifting mechanism consisting of a rack and pinion, an intermediate pawl-and-ratchet mechanism operated by said pinion, a cam connected with the pawl-and-ratchet mechanism, pivoted and spring-actuated levers, actuated alternately by said cam, and laterally-shiftable heads actuated by said levers and adapted to be placed alternately in engagement with the cross-head or eye bending devices for operating one or the other, substantially as set forth.

10. In a machine for bending the cross-heads and eyes of wire bale-ties, the combination, with separate cross-head and eye bending devices arranged sidewise of each other, their shafts, and mechanism for actuating said bending devices, of separate wire-clamping devices in line with said bending devices, shank-twisting devices connected with the shafts of said bending devices, a power-shifting mechanism between said bending devices, three sets of laterally-shifting heads operated by said power-shifting mechanism, one set for the bending, one for clamping and one for the shank-twisting devices, lever connections between the power-shifting mechanism and the heads of the bending and wire-clamping devices, and clutch connections between the shank-twisting devices and their heads for throwing one set or the other set of the bending, clamping and shank-twisting devices into or out of operation, substantially as set forth.

11. In a machine for bending the cross-heads and eyes of wire bale-ties, the combination, with the cross-head and eye bending devices their shafts and mechanism for actuating said bending devices, of wire-clamping devices in line with the bending devices, shank-twisting mechanism, applied to the shafts of the bending devices, means for throwing the wire-clamping and shank-twisting devices into operation after the cross-head or eye bending devices are actuated, means for returning the bending, wire-clamping and shank-twisting devices and their actuating mechanisms into their initial or starting positions, and means for locking the shafts of the bending devices in line with the wire-clamping devices on their return into their initial position, substantially as set forth.

12. In a machine for bending the cross-heads and eyes of wire bale-ties, the combination of shafts supported parallel with each other, cross-head and eye bending devices supported on the heads of said shafts, mechanisms for actuating said bending devices, a power-shifting mechanism between said shafts, and means connecting said power-shifting mechanism with the actuating mechanism of said bending devices for alternately operating the same, substantially as set forth.

13. In a machine for bending the cross-heads and eyes of wire bale-ties, the combination, with separate cross-head and eye bending devices and their shafts, arranged sidewise of each other, of sliding sleeves on said shafts, means between said sleeves and the bending devices for actuating the latter, an oscillating lever having a forked upper end, laterally-shiftable heads supported on said forked end, and a power-shifting mechanism engaging said heads and shifting them alternately into engagement with the sleeves of the cross-head or eye bending devices, substantially as set forth.

14. In a machine for bending cross-heads and eyes of wire bale-ties, the combination, with separate cross-head and eye bending devices and their shafts, arranged sidewise of each other, of two sets of sliding sleeves on said shafts, means between said sleeves and bending devices for actuating the latter, shank-twisting mechanisms connected with said shafts, an oscillating lever engaging the sleeves of the bending devices, clutches connected with the second set of sleeves, a second oscillating lever actuating the second set of sleeves, laterally-shiftable heads supported in the upper ends of both actuating-levers, means for oscillating said levers at the proper time, and a power-shifting mechanism engaging alternately the laterally-shiftable heads of the bending and shank-twisting devices, substantially as set forth.

15. In a machine for bending the cross-heads and eyes of wire bale-ties, the combination, with separate cross-head and eye bending devices and their shafts, arranged sidewise of each other, of sliding sleeves on said shafts, means between said sleeves and the bending devices for actuating the latter, an oscillating lever, laterally-shiftable heads supported on the upper end of said lever, wire-clamping devices in line with the bending devices, means for actuating said wire-clamping devices at the proper time, laterally-shiftable heads engaging the actuating means of the wire-clamping levers, a power-shifting mechanism, and means for connecting it alternately with the shiftable heads of the bending and wire-clamping devices, substantially as set forth.

16. In a machine for bending the cross-heads and eyes of wire bale-ties, the combination, with separate cross-head and eye bending devices and their shafts, arranged sidewise of each other, of sliding sleeves on said shafts, means between said sleeves and the bending devices for actuating the latter, an oscillating lever, laterally-shiftable heads supported on the upper end of said lever, separate wire-clamping devices in line with the bending devices, oscillating ejectors arranged adjacent to said wire-clamping devices, means for actuating said wire-clamping devices at the proper time, laterally-shiftable heads connected with the actuating means of the wire-clamping devices, a power-shifting mechanism operated by the oscillating lever, means between the power-shifting mechanism and the laterally-shiftable heads of the bending and wire-clamping devices for alternately actuating one set or the other, and means connecting the sliding sleeves with the ejectors for actuating one or the other after the bending and wire-clamping devices have been operated, substantially as set forth.

17. In a machine for bending the cross-heads and eyes of wire bale-ties, the combination, with cross-head and eye bending, wire-clamping, shank-twisting, and ejecting devices, and oscillating levers for operating said devices, of a power-shifting mechanism consisting of a rack and pinion, operated by one of said levers, a pawl-and-ratchet mechanism operated by said pinion, a cam operated intermittently by said pawl-and-ratchet mechanism, pivoted and spring-actuated levers having raised portions actuated alternately by said cam, and laterally-shiftable heads supported on the upper ends of the oscillating levers and shifted alternately in opposite directions by the cam-actuated levers, substantially as set forth.

18. In a machine for bending the cross-heads and eyes of wire bale-ties, the combination, with the cross-head and eye bending devices and their shafts, of sliding sleeves on said shafts, means between said sleeves and the bending devices for actuating the latter, an oscillating lever, laterally-shiftable heads supported on the upper end of said lever, wire-clamping devices in line with the bending devices, laterally-shiftable heads for said wire-clamping devices, pivoted and spring-actuated ejectors adjacent to said wire-clamping devices, a power-shifting mechanism operated by the oscillating lever, means for connecting said power-shifting mechanism with the shiftable heads of the bending and wire-clamping devices, and reciprocating slide-pieces between the sleeves and the ejectors for oscillating the latter and throwing out the finished bale-ties alternately at opposite sides of the machine, substantially as set forth.

19. In a machine for bending the cross-heads and eyes of wire bale-ties, the combination, with the wire-clamping devices, of pivoted and spring-actuated ejectors arranged adjacent to said clamping devices, spring-actuated latches hinged to the lower ends of the ejectors, guided and reciprocating slide-pieces provided with inclined outer ends for engaging the latches on the ejectors, sliding sleeves on the shafts of the cross-head and eye bending devices and upright arms at the inner ends of the slide-pieces, connected with said sleeves, substantially as set forth.

20. In a machine for bending the cross-heads and eyes of wire bale-ties, the combination, with the wire-clamping devices, of pivoted and spring-actuated ejectors arranged alongside transversely to said clamping devices, said ejectors being provided with inclined portions at their upper ends facing in opposite directions, spring-actuated latches hinged to the lower ends of the ejectors, reciprocating slide-pieces guided below the wire-clamping devices and provided with straight outer ends and inclined portions adjacent to said ends for engaging the latches, sliding sleeves on the shafts of the cross-head and eye bending devices, and upright arms at the inner ends of the slide-pieces connected with said sleeves for ejecting the wire bale-ties on the return motion of the sleeves and slide-pieces, substantially as set forth.

In testimony that I claim the foregoing as my invention I have signed my name in presence of two subscribing witnesses.

BRUNO VON BÜLTZINGSLÖWEN.

Witnesses:
    PAUL GOEPEL,
    C. P. GOEPEL.